United States Patent
Jacobs et al.

(10) Patent No.: US 8,069,877 B2
(45) Date of Patent: Dec. 6, 2011

(54) PRESSURE COMPENSATING FLUSH VALVE WITH SELF-CLEANING PISTON

(75) Inventors: Barry Jacobs, Cranford, NJ (US); Frank Seggio, Wayside, NJ (US); Frank Christ, Bausendorf (DE); Juergen Sponheimer, Klausen (DE); Walter Schmitz, Bruch (DE)

(73) Assignee: AS IP Holdco, LLC, Piscataway, NJ (US)

( * ) Notice: Subject to any disclaimer, the term of this patent is extended or adjusted under 35 U.S.C. 154(b) by 638 days.

(21) Appl. No.: 12/151,334

(22) Filed: May 6, 2008

(65) Prior Publication Data

US 2008/0277612 A1 Nov. 13, 2008

Related U.S. Application Data

(60) Provisional application No. 60/916,385, filed on May 7, 2007.

(51) Int. Cl.
*E03B 1/00* (2006.01)

(52) U.S. Cl. ............. 137/613; 137/509; 137/513.5; 251/28; 251/40

(58) Field of Classification Search .......... 251/28, 251/33, 40, 41; 137/509, 613, 513.5, 513.3; 138/45
See application file for complete search history.

(56) References Cited

U.S. PATENT DOCUMENTS

| | | | |
|---|---|---|---|
| 1,647,189 A | 11/1927 | Mueller et al. | |
| 2,418,817 A | 4/1947 | Cantlin | |
| 2,620,826 A * | 12/1952 | Johns | 251/40 |
| 2,638,924 A | 5/1953 | St. Clair | |
| 2,916,251 A * | 12/1959 | Butts | 251/40 |
| 2,973,001 A | 2/1961 | McAuley | |
| 3,050,086 A * | 8/1962 | Honsinger | 138/45 |
| 3,056,574 A | 10/1962 | Greenawalt | |
| 3,400,731 A | 9/1968 | McComack | |
| 3,842,857 A * | 10/1974 | McCornack | 137/242 |
| 3,902,521 A * | 9/1975 | Keller et al. | 137/375 |
| 3,965,922 A | 6/1976 | McCornack | |
| 3,971,412 A | 7/1976 | Wierzbicki | |
| 4,210,309 A * | 7/1980 | Grenier | 251/35 |
| 4,272,052 A * | 6/1981 | Gidner | 251/39 |
| 4,313,471 A * | 2/1982 | Lissau | 138/45 |
| 4,331,179 A | 5/1982 | Gray | |
| 4,516,600 A | 5/1985 | Sturman et al. | |
| 4,662,602 A * | 5/1987 | Johnson | 251/44 |
| 5,052,060 A * | 10/1991 | Makita et al. | 4/300 |
| 5,362,026 A * | 11/1994 | Kobayashi et al. | 251/30.02 |
| 5,409,042 A * | 4/1995 | Kirchner | 138/42 |
| 5,456,279 A * | 10/1995 | Parsons et al. | 137/245 |
| 6,000,674 A * | 12/1999 | Cheng | 251/26 |
| 6,408,873 B1 | 6/2002 | Hall et al. | |
| 6,789,567 B2 * | 9/2004 | Meyer | 137/517 |
| 6,896,237 B2 | 5/2005 | Beh et al. | |
| 7,028,975 B2 * | 4/2006 | Lee et al. | 251/26 |
| 7,487,950 B2 * | 2/2009 | Johnson | 251/40 |
| 2005/0056322 A1 * | 3/2005 | Yen | 137/550 |
| 2008/0196774 A1 * | 8/2008 | Weston | 137/503 |

\* cited by examiner

*Primary Examiner* — John Fristoe, Jr.
*Assistant Examiner* — Marina Tietjen
(74) *Attorney, Agent, or Firm* — Paul A. Levy; Matthew K. Ryan; Frommer Lawrence & Haug LLP (57) ABSTRACT

A flush valve according to the present disclosure includes a pressure compensating device for toilet and urinals to ensure consistent flush and bowl refill volumes. Certain flush volume limits may required for compliance with federal, state and local regulations regarding water usage. The flush valve can adjust water flow rates within the prescribed water usage limits and does not sacrifice the toilet's bowl washing and waste removal capabilities.

6 Claims, 7 Drawing Sheets

PRESSURE COMPENSATING FLUSH VALVE WITH SELF-CLEANING PISTON

This application claims the benefit of U.S. Provisional Application No. 60/916,385, filed May 7, 2007.

BACKGROUND

1. Field of the Invention

The present invention is directed to a flow control apparatus for toilet flush valves. More particularly, the present invention is directed to a flow regulator for a flush valve assembly.

2. Description of Related Art

Toilets for removing waste products are well known for having three systems that work together to perform a flushing action: a toilet fixture, a flush mechanism and a refill mechanism. Toilet valves typically operate between a fully open position and a fully closed position so that abrupt changes in flow rates occur. This phenomenon can frequently affect overall system line pressure, such that the opening of one valve in a plumbing system will reduce the system pressure (and thus the flow through) of another pre-opened valve.

During the past two decades, toilets and other waste removal devices have been subjected to restrictions on water usage, due primarily to the excessive global consumption of potable water. An increasing global population has negatively affected the amount and quality of suitable water, and many federal and local authorities have responded by enacting regulations that reduce the water demand required by toilet flushing operations. In the United States, for instance, government agencies that regulate water usage have gradually reduced the threshold for fresh water use in toilets, from 7 gallons/flush (prior to the 1950s) to 5.5 gallons/flush (by the end of the 1960s) to 3.5 gallons/flush (in the 1980s). The National Energy Policy Act of 1995 now mandates that toilets sold in the United States can only use 1.6 gallons/flush (6 liters/flush), and similar regulations exist in numerous countries.

It is a basic principle that water within a water distribution system of a building will follow the path of least resistance. The water piping systems within a building will rarely maintain the same residual pressure due to the variations in use. This fact is even more prevalent within mid-size to large facilities where the systems are increasingly complex. Water outflow quantity and time (i.e., flow rate and volume) fluctuate due to variations in water pressure in the connecting water pipe. When water pressure increases within a predetermined flush cycle, water outflow quantity also increases, resulting in wasted water and higher water bills. Due to higher water pressure and faster water discharge speed, water flushing in the toilet tends to cause undesirable splashing outside of the bowl region. When water pressure is low, discharge force is inadequate, thereby weakening the flushing load removal and cleaning effect.

SUMMARY OF THE INVENTION

In one aspect of the present invention, a toilet flush valve includes an inlet flow regulator to receive flush water at an intake water pressure during a flush cycle and provide flush water at a constant flow rate. A piston chamber to receive flush water at a constant flow rate from the inlet flow regulator and having a discharge outlet and a piston valve disposed in the piston chamber, the piston valve moveable between a valve open position and a valve closed position to affect the flow rate of flush water through the discharge outlet. A substantially constant flow rate of the flush water through the discharge outlet is maintained through the flush cycle.

In one implementation the flow rate of flush water provided by the inlet flow regulator is inversely proportional to the intake water pressure.

In another implementation, inlet flow regulator includes an inlet housing having housing openings through a periphery thereof and an inlet regulator piston disposed within the inlet housing and having regulator openings in a periphery thereof, the inlet regulator piston movable based on the intake water pressure. The movement of the inlet regulator piston in the inlet housing affects the alignment of the regulator openings with the housing openings, and the flow rate of the flush water through the inlet flow regulator is determined by the alignment of the regulator and housing openings.

It is an advantage of the present invention to provide a flush valve assembly that maintains consistent flush volumes and sufficient performance regardless of incoming water pressure.

It is a further advantage of the present invention to provide a constant water flow over a very wide pressure range (i.e., from about 20 to about 80 PSI).

A flush valve assembly disclosed herein can ensure delivery of consistent flush water volume by responding to variations of intake water pressure, and accomplish predictable and repeatable flush volumes in compliance with prevailing water use guidelines.

Various other advantages and features of the present invention will become readily apparent from the ensuing detailed description and the novel feature will be particularly pointed out in the appended claims.

DETAILED DESCRIPTION

A flush valve according to the present disclosure includes a pressure compensating device for toilets to ensure consistent flush and bowl refill volumes. Certain flush volume limits may be required for compliance with federal, state and local regulations regarding water usage. Such a device can adjust water flow rates within the prescribed water usage limits and does not sacrifice the toilet's bowl washing and waste removal capabilities.

Now referring to the figures, where like numerals identify like elements, pressure compensating flush valve 10 of the present invention is supplies flushing water to a toilet bowl, urinal, or other device that may require a constant flow rate of water over a predetermined time. The term "toilet fixture" as used herein refers to a variety of waste removal devices (including varieties of toilet and urinal configurations) and is not limited to a tank and bowl combination as described herein.

Figure 1:
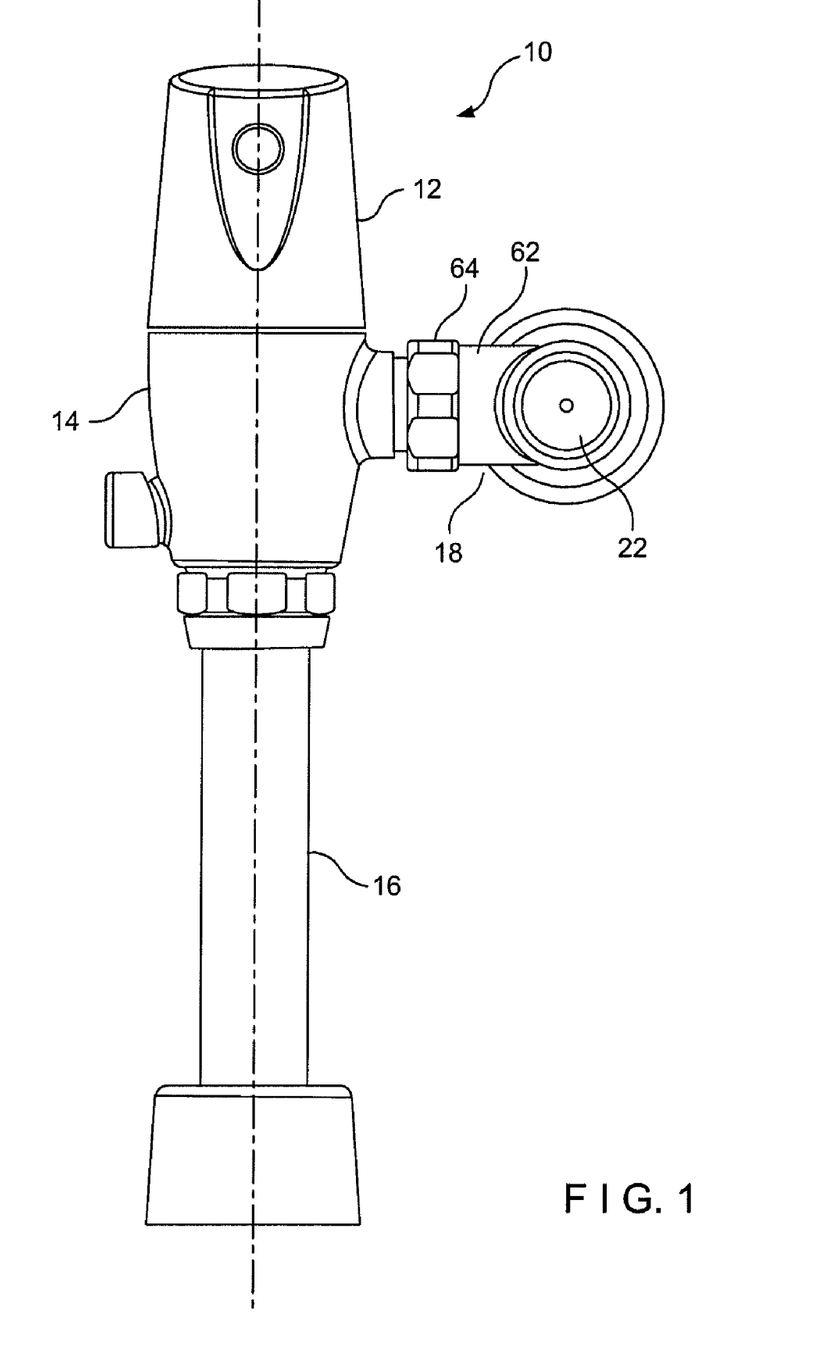
FIG. 1 illustrates a pressure compensating flush valve of the present invention.
Figure 2:
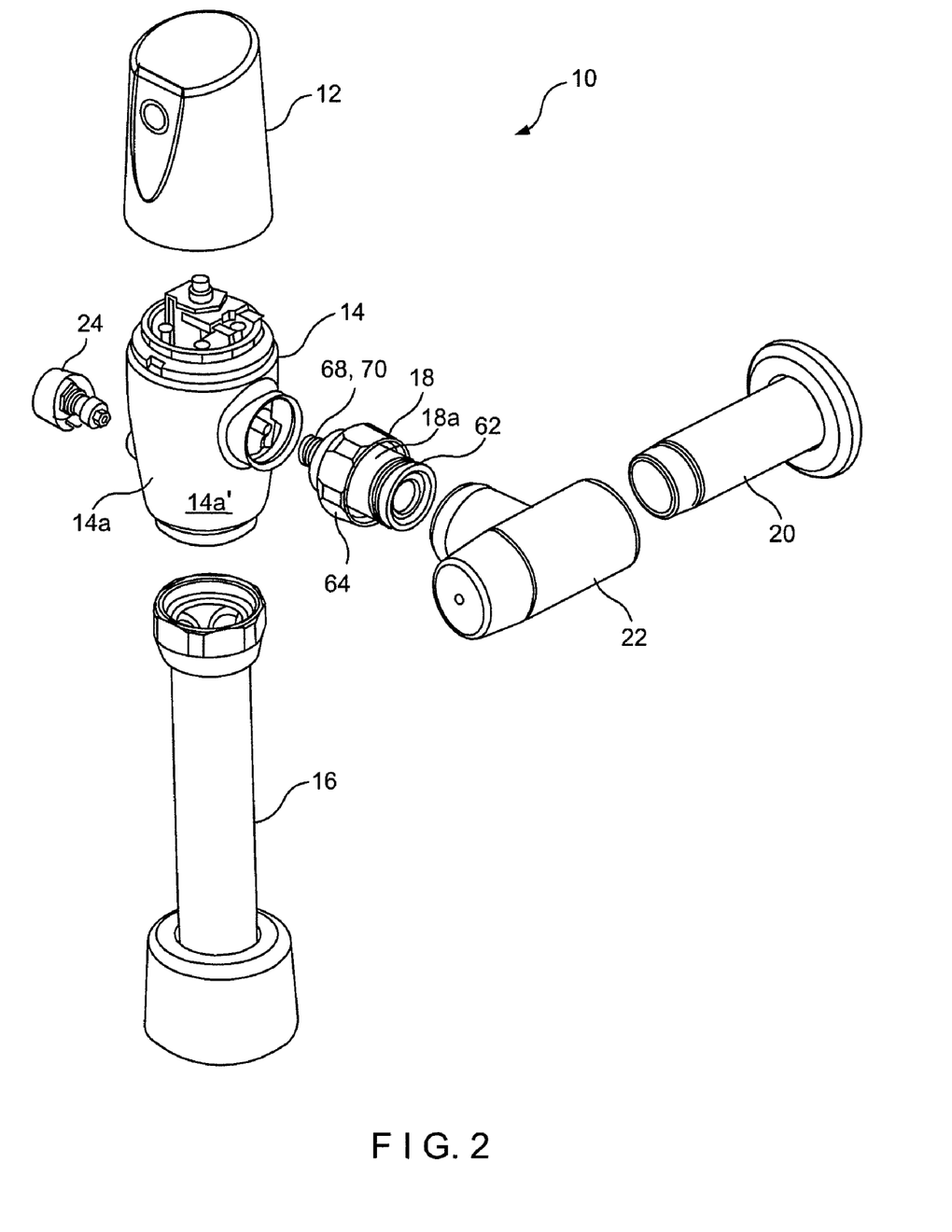
FIG. 2 illustrates an exploded view of the pressure compensating flush valve of FIG. 1.

Referring particularly to FIGS. 1 and 2, flush valve 10 comprises a cover assembly 12, a flush valve assembly 14 and a vacuum breaker assembly 16 disposed in fluid communication along a common longitudinal axis 1. Assemblies 12, 14 and 16 may be provided as an integral member, or alternatively, any of the assemblies may be detachably joined via common fastening means such as complementary threads, complementary recesses and notches, epoxy and any combination thereof and any equivalent means.

Figure 4:
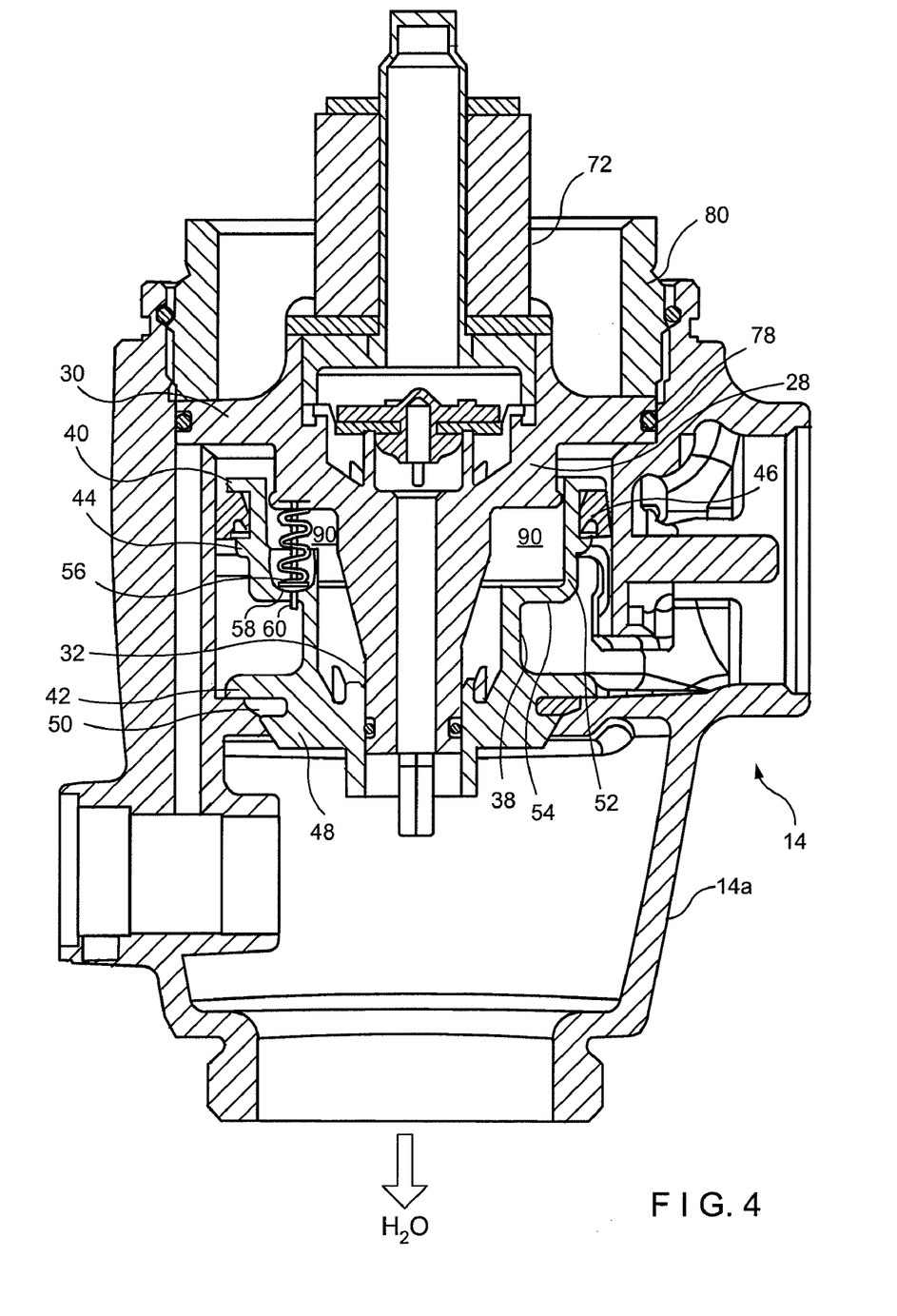
FIG. 4 illustrates a cross-section of a flush valve assembly comprising part of the pressure compensating flush valve of FIG. 1.
Figure 5:
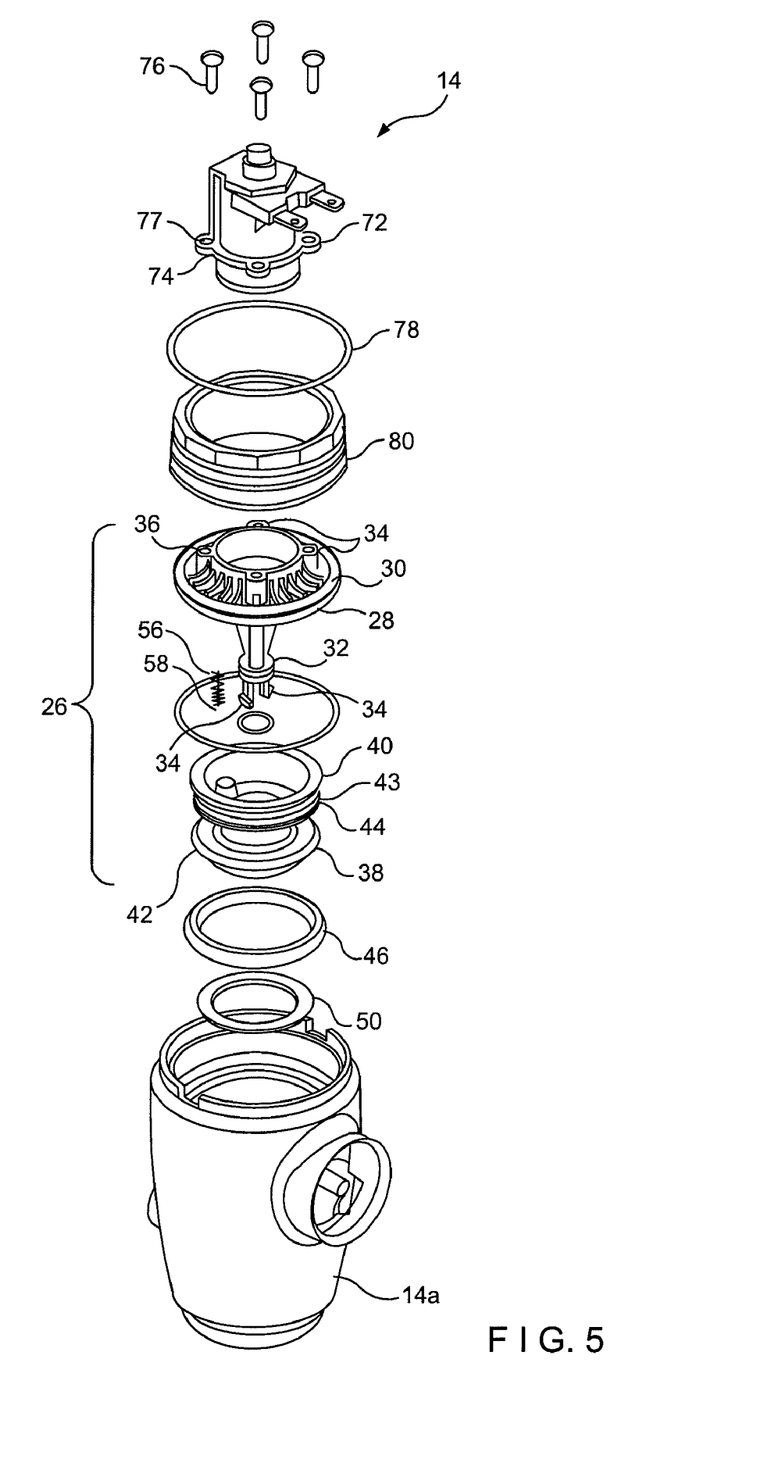
FIG. 5 illustrates an exploded view of the flush valve assembly of FIG. 4.

Flush valve assembly 14 includes a body 14a that houses multiple operative components of flush valve 10. Body 14a has an exterior peripheral surface 14a', to which a flow regulator 18 is disposed in fluid communication with flush valve assembly 14, and an interior peripheral surface 14a" that defines an area to accommodate housing and operation of a reciprocatable piston assembly and solenoid assembly therein (as further described herein below with reference to FIGS. 3, 4 and 5). An inlet pipe 20 provided in fluid communication with flow regulator 18 delivers water from a water supply source (not shown) during a flushing operation, which water travels through vacuum breaker assembly 16 prior to delivery to a toilet fixture. A stop valve assembly 22 may be provided intermediate inlet pipe 20 and flow regulator 18 to ensure manual access for adjustment or cessation of fluid flow. A manual valve 24 shown on an opposed surface of body surface 14a' is electively disposed thereon to provide further manual flush valve capabilities in the event of power failure.

A piston valve assembly 26 housed in body 14a includes a piston 38 having and an annular flange 30 from which an elongate finger 32 extends toward a downstream extent of body 14a. An upstream extent of annular flange 30 features at least one fastening recess 36 integral therewith that accommodates insertion of complementary fasteners, as further described herein below.

Piston valve assembly 38 is positioned adjacent valve holder 28 that includes an upstream annular flange 40 and a downstream annular flange 42. Upstream flange 40 and an adjacent sealing flange 44 define a predetermined space 43 therebetween for sealing accommodation of a wiper seal 46 therewithin. Downstream flange 42 and an adjacent sealing flange 48 are similarly disposed relative to one another to effect sealing engagement of a sealing ring 50 therebetween.

Valve holder 28 has an internal annular wall 52 that is defined generally normally relative to an annular floor 54 in communication therewith. Annular wall 52 and annular floor 54 together accommodate reciprocatable disposition of a nozzle spring 56 in combination with a reciprocatable pin 58 disposed along a central axis thereof. An upstream extent of spring 56 is detachably secured to a downstream portion of piston 38 and a downstream end of spring 56 is positioned adjacent annular floor 54 and more particularly adjacent a predefined orifice 60 defined therethrough. In this configuration, reciprocation of piston assembly 26 in response to fluid pressure thereon consequently induces like reciprocating movement of pin 58 through orifice 60. As fluid pressure increases, spring 56 biases piston 38 upstream while pin 58 moves freely within orifice 60. After the desired directional movement of piston 38 has been achieved, fluid pressure in combination with spring 56 reciprocally urges the piston to its original position. The interval of return movement is thereby controlled by a metering passage defined by orifice 60 to permit a predetermined discharge flow of water whereby the interval during which the piston is in operation is controlled.

The movement of pin 58 moves within orifice 60 can tend to keep foreign matter from lodging in orifice 60. Moreover, as discussed above, the time interval of return movement of piston 38 is controlled by the passage of water through orifice 60. In turn, the passage of water through the orifice is governed by the cross-sectional area of the orifice that is not obstructed by the pin. Because pin 58 is in orifice 60, the passage of metering water in orifice 60 flows around pin 58. The flow of the metering water is proportional to a cross-sectional area of the substantially annular space between the pin 58 and a perimeter wall of the orifice 60. The time interval of return determines the refill of the fixture. Thus, for a given flow rate of metering water, the diameter of the orifice 60 may be increased because of pin 58 over an orifice without a pin obstructing an area of the orifice. However, it is easier for foreign matter to collect in an orifice without a pin because the annular ring presents a smaller clearance for foreign matter to enter between the pin and the orifice wall.

Flow regulator 18 that is disposed in fluid communication with flush valve assembly includes an adaptor 62 and nut 64 to accommodate fastening of the flow regulator to one or more of the flush valve assembly 14, inlet pipe 20 and stop valve 22. A regulator body 18a houses a regulator piston 66 therewithin in combination with at least one biasing means (shown herein as concentric compression springs 68 and 70). During fluid delivery from inlet pipe 20 to flush valve assembly 14, there are two forces acting on piston 66, seeking to return the piston to its at rest position: the flow of fluid past piston 66 and the urging of the biasing means (i.e., springs 68 and 70). This combination of fluid controls, in tandem with the metering function of piston assembly 26, enables control of water volume by changing the time function independently of incoming fluid pressure. It is therefore possible to maximize flow for the toilet fixture and maintain constant flow over a larger time (larger effective energy curve) independently of incoming fluid pressure. This feature is desirable to ensure compliance with applicable water usage standards for toilets and urinals. In addition, this combination of features can inhibit tampering with the toilet fixture to adjust water volumes.

Cover assembly 12, in combination with flush valve assembly body 14a, houses a solenoid assembly 72 that effects water delivery to flush valve 10 and ultimately to a toilet fixture in fluid communication therewith. Solenoid assembly 72 includes a commercially available solenoid valve that controls the opening and closing of orifice 60 as further described herein below. A controller (not shown) in electronic communication with flush valve 10 effects operation of the solenoid valve via communication with a sensor (not shown) that can be programmed to detect various conditions (including, but not limited to, the presence of a user, the pressure of an incoming water supply, the expended water volume, etc.). It may be desirable to program the solenoid valve with a predetermined range of water pressures within which flush valve 10 will operate to limit the expended water volume to the amounts prescribed by regulatory agencies. The solenoid valve used with solenoid assembly 72 is selected from any one of a plurality of commercially available solenoid valves, or may be replaced by any other electronically controlled valve. In the alternative, a conventional electromagnetic or other mechanical flush valve may be used without departing from the scope of the present invention.

Solenoid assembly 72 includes an annular fastening ring 74 that facilitates coupling thereof to piston assembly 26 via fastening of at least one fastener 76 to at least one complementary recess 77 or 36. It is well understood that coupling may be effected by any other known means that is amenable to the practice of the present invention.

A sealing means such as O-ring 78 is selectively provided for sealing engagement of an upstream end of piston 38 relative to solenoid assembly 72. A bonnet nut 80 is further selectively provided to ensure effective coupling of solenoid assembly 72 with piston assembly 26 during operation of flush valve 10 in a toilet fixture.

Figure 3:
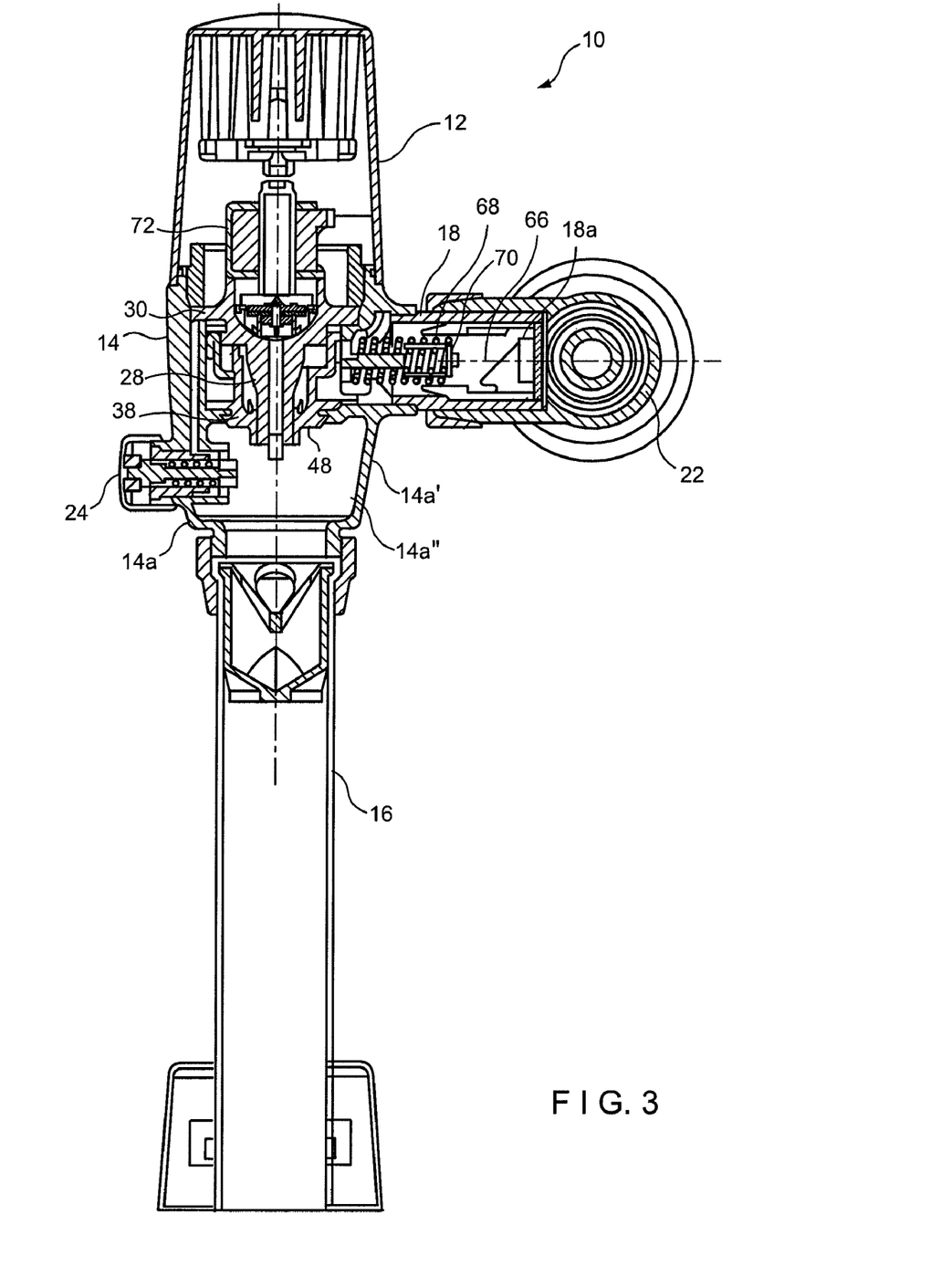
FIG. 3 illustrates a longitudinal sectional view of the pressure compensating flush valve of FIG. 1.

Upon initiation of the flush cycle (initiated, for example, by a sensor detecting a user's presence, or by a user depressing a trip lever or flush button), water supply inlet pipe delivers water at an initial delivery pressure to flush valve 10, such that water travels through flow regulator piston 66 to piston assembly 26 of flush assembly 14. Springs 68 and 70 confer an opposing biasing force on piston 66 such that pressure compensation of the delivered water is effected prior to delivery to flush assembly 14. As water reaches the interior of body 14a, orifice 60 communicates the flow area with a pressure chamber 90 formed there adjacent. Spring 56 causes reciprocating movement of pin 58 in orifice 60 during each operation of piston 38 such that escape of fluid through the orifice controls the rate of return of piston 38 after actuation of flush valve 10. Fluid entering chamber 90 forestalls immediate return of piston 38 to its rest position. Fluid must therefore traverse orifice 60 before piston 38 can re-seat itself relative to valve holder 28. Orifice 60 has a predetermined diameter that provides a desirable temporal delay between initiation of a flush operation and re-seating of piston 38 to shut off fluid supply to the toilet fixture. With each stroke of pin 58 through orifice 60, the pin and orifice remain free of deleterious debris, thereby preserving enhanced operation of the flush valve.

Figures 7A, 7B:
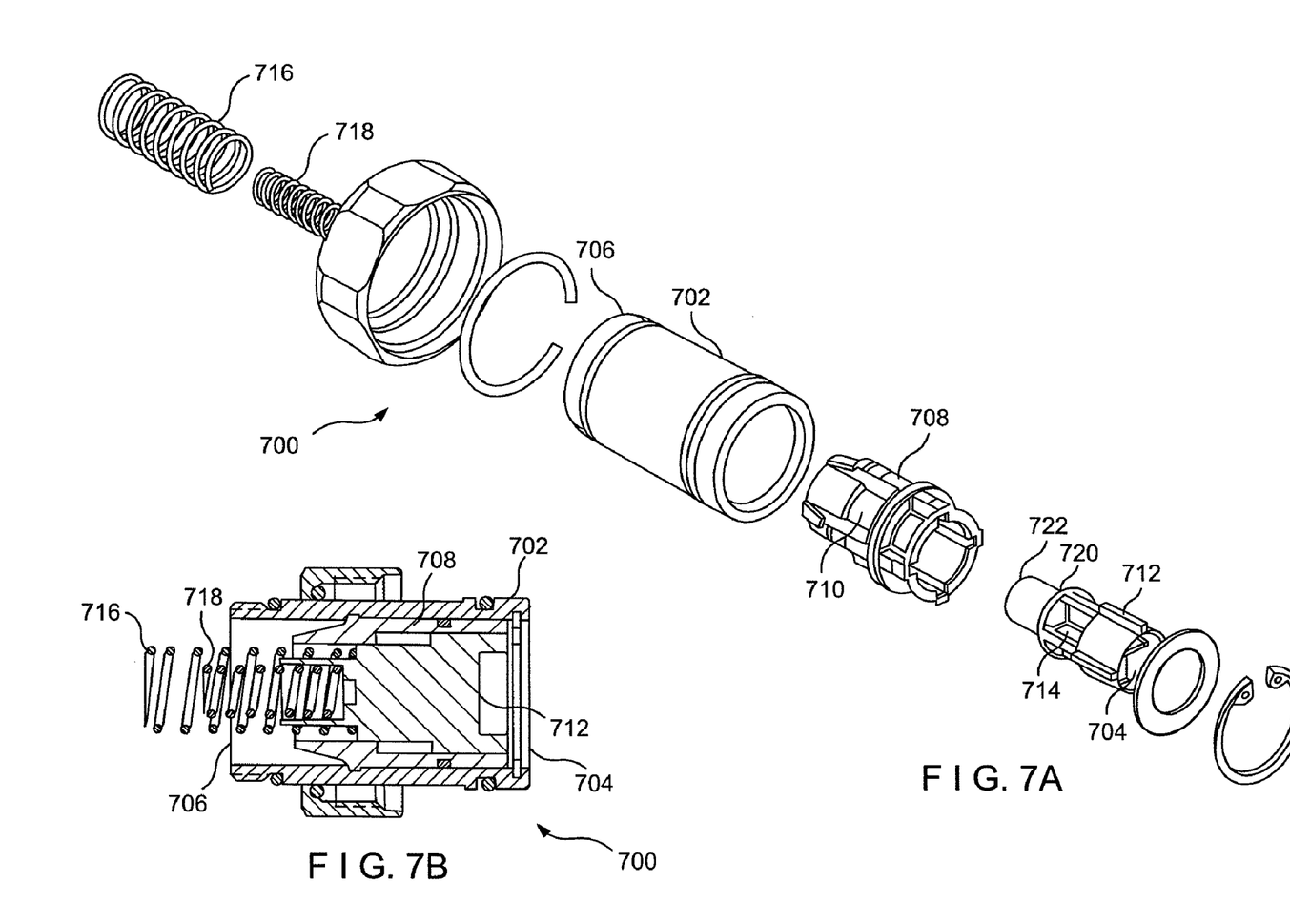
FIG. 7A illustrates an exploded view of a flow regulator in accordance with the present disclosure.
FIG. 7B illustrates a cross-sectional view of the assembled flow regulator of FIG. 7A.

FIG. 7A illustrates an exploded view of an implementation of a flow regulator 700 in accordance with the present disclosure. FIG. 7B is a cross-sectional view of the flow regulator 700. Flow regulator 700 includes an outside casing 702 to retain the parts of the flow regulator and direct flow of flush water through the flow regulator from an inlet port 704 to an outlet port 706. A regulator housing 708 is disposed within outside casing 702. Regulator housing 708 is substantially hollow and has one or more openings 710 in a periphery thereof. A regulator piston 712 can be disposed within the hollow area of regulator housing 708. Regulator piston 712 is substantially hollow to permit the flow of water therethrough and has one or more openings 714 in a periphery thereof. Regulator piston is movable along an axis of the regulator housing. Flow regulator 700 includes bias springs 716 and 718. In the implementation shown, bias springs 716, 718 are helical springs. First bias spring 718 is concentrically disposed within second bias spring 716. In this implementation, first bias spring 718 is shorter in length than second bias spring 716. When assembled, an end of second bias spring 716 can contact an interior end surface 720 of regulator piston 712 and an extended interior end 722 of regulator piston 720 can inhibit excessive wobbling of first bias spring 718 within second bias spring 716.

Intake water from the water supply can enter the flow regulator 700 through inlet port 704. The pressure of the intake water can urge movement of the regulator piston 712 in regulator housing 708 against an inhibiting force of second bias spring 716. Movement of regulator piston 712 is proportional to the pressure of the intake water. Movement of the regulator piston 712 in regulator housing 708 affects the alignment of piston openings 714 with housing openings 710. Increased intake pressure can cause an alignment of the openings 714, 710 that can tend to inhibit the flow rate of the intake water through the flow regulator.

After a predetermined pressure of intake water is exceeded, the regulator piston extended end 722 can contact first bias spring 718. Thus above a predetermined pressure both first bias spring 716 and second bias spring 718 may act to oppose further movement of regulator piston 712 in regulator housing 708.

Figure 6:
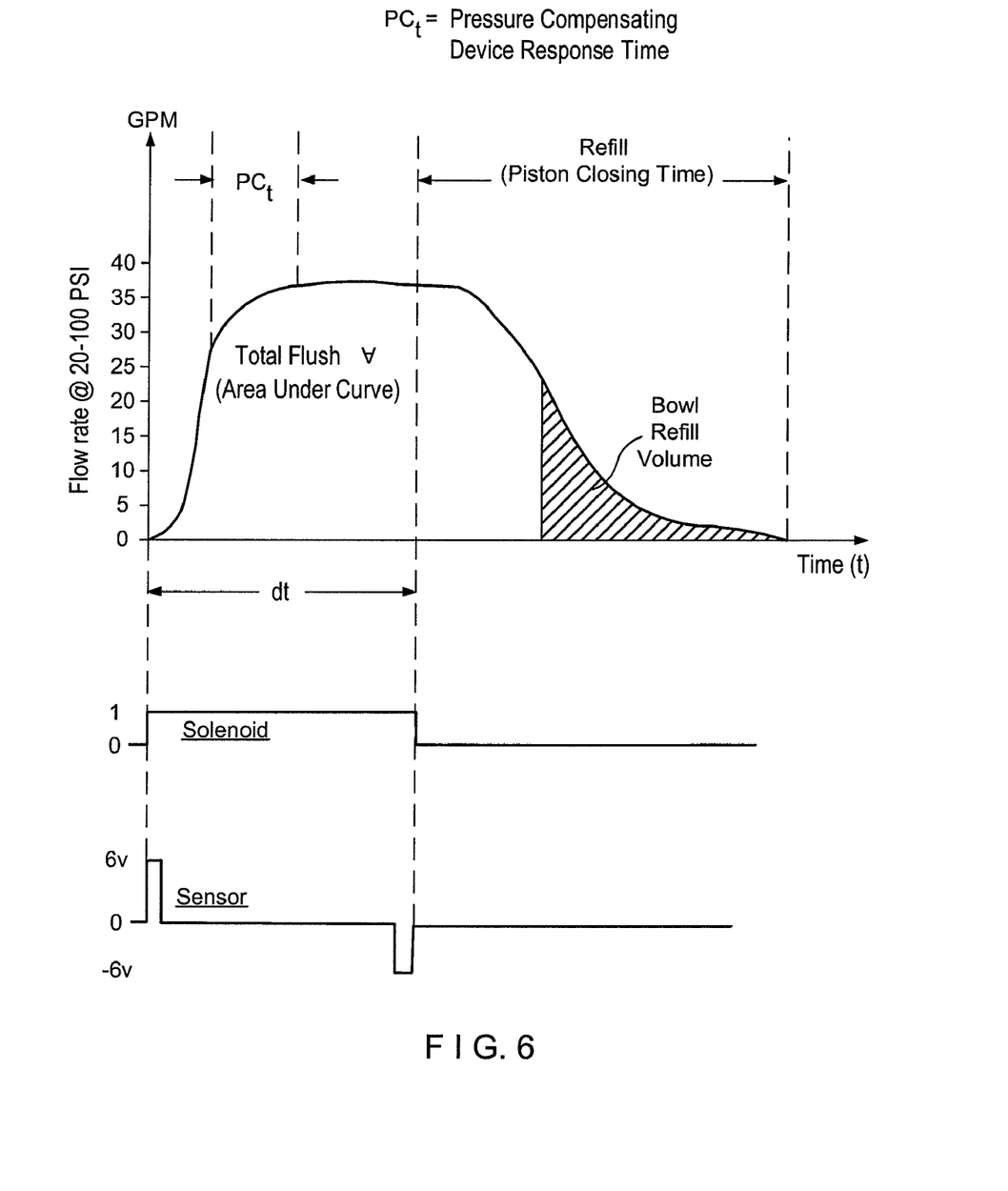
FIG. 6 illustrates a graph of the total flush volume realized over time in relation to the water input flow over a pressure range of about 20 PSI to about 100 PSI.

Flush valve 10 can readily adjust itself in response to a wide range of pressure fluctuations during a flush cycle. The curve of FIG. 6 illustrates an example of the flow rate in gallons per minute (GPM) versus time for a variable flow rate over a wide range (i.e., from about 20 PSI to 80 PSI). At 20 PSI (140 kPa), the pressure compensating valve of the present invention comes to full flow and holds that flow across a full range of water pressures. If the initial water pressure is at a low extent of the range, flush valve 10 will open and remain open until a predetermined water volume exits input pipe 20. Such predetermined water volume is consistent with applicable water usage regulations and further consistent with the type of waste being removed from the toilet fixture. Should water pressure suddenly increase during the flush cycle, the flow regulator adjusts the flow rate to compensate to provide a constant flow rate through the flush valve. When a maximum predetermined volume is attained, flush valve 10 returns to a closed position, thereby ensuring that no water is wasted during the flush cycle and further ensuring that sufficient flush water is delivered for waste removal from the toilet fixture.

Other implementations are within the scope of the following claims.

What is claimed is:

1. A method of controlling a water flow rate in a flush valve, comprising:
   receiving flush water at an intake water pressure during a flush cycle;
   providing flush water to a flush valve at a constant flow rate;
   moving a piston valve between a valve open position and a valve closed position to affect the flow rate of flush water through the flush valve by altering the size of openings through which the flush water travels based on the intake water pressure;
   wherein the piston valve includes an inlet regulator piston disposed in an inlent housing, the inlet regulator piston having regulator openings in a periphery thereof and the inlet regulator piston being movable based on the intake water pressure, the movement of the inlet regulator piston in the inlet housing affecting the alignment of the regulator openings with housing openings in the inlet housing,
   wherein the flow rate of the flush water through the inlet flow regulator is determined by the alignment of the regulator housing openings, and
   discharging flush water from the flush valve for a predetermined time interval,
   wherein a substantially constant flow rate of the flush water through a discharge outlet is maintained through the flush cycle.

2. The method of claim 1, wherein the flow rate of flush water provided to the flush valve is inversely proportional to the intake water pressure.

3. The method of claim 2, further comprising:
   urging the inlet regulator piston against movement by the intake water pressure below a first predetermined intake water pressure;
   disposing a second spring concentric with a first spring and disposed therein, the second spring having a shorter length than the first spring; and urging the inlet regulator piston against movement by the intake water pressure below a second predetermined intake water pressure, wherein, during the flush cycle, pressure of the flow of flush water past the inlet regulator piston and the urging of the first and second springs operate to maintain flush water at a constant flow through the discharge outlet.

4. The method of claim 1, comprising:

coupling a metering pin to the piston valve, the metering pin moveable in a metering orifice, the movement of the metering pin responsive to the movement of the piston valve toward the valve open position, wherein a time interval for return of the piston valve to the valve closed position is determined by the passage of water through the metering orifice during the flush cycle.

5. The toilet flush valve of claim 4, wherein the piston valve is biased toward the valve closed position against an opposite force proportional to a flush water discharge pressure.

6. The toilet flush valve of claim 5, wherein movement of the metering pin in the metering orifice operates to inhibit clogging of the metering orifice.

* * * * *